US009215003B2

United States Patent
Hayashi et al.

(10) Patent No.: US 9,215,003 B2
(45) Date of Patent: Dec. 15, 2015

(54) COMMUNICATION APPARATUS, COMMUNICATION METHOD, AND COMPUTER READABLE RECORDING MEDIUM

(71) Applicant: Olympus Imaging Corp., Shibuya-ku, Tokyo (JP)

(72) Inventors: Toshikazu Hayashi, Sagamihara (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 163 days.

(21) Appl. No.: 13/779,164

(22) Filed: Feb. 27, 2013

(65) Prior Publication Data

US 2013/0231065 A1 Sep. 5, 2013

(30) Foreign Application Priority Data

Mar. 2, 2012 (JP) ................................ 2012-047150

(51) Int. Cl.
| | |
|---|---|
| *H04M 1/00* | (2006.01) |
| *H04B 7/26* | (2006.01) |
| *H04M 1/725* | (2006.01) |
| *H04M 1/2755* | (2006.01) |

(52) U.S. Cl.
CPC ............ *H04B 7/26* (2013.01); *H04M 1/7253* (2013.01); *H04M 1/2755* (2013.01); *H04M 2250/52* (2013.01)

(58) Field of Classification Search
USPC ......... 455/73, 41.2, 69, 130, 557, 556.1, 566, 455/550.1, 556.2, 41.1, 456, 414.2, 457
See application file for complete search history.

(56) References Cited

U.S. PATENT DOCUMENTS

| | | | | |
|---|---|---|---|---|
| 7,466,992 B1* | 12/2008 | Fujisaki | ........ | H04M 1/274516 455/412.1 |
| 7,890,089 B1* | 2/2011 | Fujisaki | ........ | H04M 1/56 455/414.2 |
| 8,559,983 B1* | 10/2013 | Fujisaki | ........ | H04W 4/02 455/414.2 |
| 2003/0045301 A1* | 3/2003 | Wollrab | ........ | G06Q 10/109 455/456.1 |
| 2006/0009259 A1* | 1/2006 | Tanaka | ........ | H04N 1/00127 455/556.1 |
| 2006/0080719 A1* | 4/2006 | Minatogawa | ........ | H04N 1/00127 725/105 |
| 2011/0037712 A1* | 2/2011 | Kim et al. | ........ | 345/173 |
| 2012/0045059 A1* | 2/2012 | Fujinami | ........ | H04L 9/0866 380/273 |

FOREIGN PATENT DOCUMENTS

JP 4174208 8/2008

* cited by examiner

*Primary Examiner* — Ganiyu A Hanidu
(74) *Attorney, Agent, or Firm* — John C. Pokotylo; Straub & Pokotylo

(57) ABSTRACT

A communication apparatus includes an operation information converting unit that converts a relative position change between a portable apparatus and a communication apparatus into operation information in order to establish wireless communication with the portable apparatus, a transceiving unit that receives the operation information from the portable apparatus, and a transmission control unit that causes the transceiving unit to establish communication for transmitting content data to the portable apparatus when the operation information received by the transceiving unit matches operation information which is set in advance.

14 Claims, 12 Drawing Sheets

COMMUNICATION APPARATUS, COMMUNICATION METHOD, AND COMPUTER READABLE RECORDING MEDIUM

CROSS REFERENCES TO RELATED APPLICATIONS

This application is based upon and claims the benefit of priority from Japanese Patent Application No. 2012-047150, filed on Mar. 2, 2012, the entire contents of which are incorporated herein by reference.

BACKGROUND OF THE INVENTION

1. Field of the Invention

The present invention relates to a communication apparatus that transmits content data including image data to another electronic apparatus according to a specified wireless communication standard, a communication method by the communication apparatus, and a computer readable recording medium.

2. Description of the Related Art

It is known that content data including image data captured by a mobile phone with a camera or the like is transmitted to an external apparatus such as a personal computer according to a specified wireless communication standard (for example, see Japanese Patent No. 4174208). In this technique, a bar code is displayed on a display of an apparatus of a transmission target as device address information necessary for wireless communication, and an image of the bar code is captured by a camera of a transmission side mobile phone, so that setting for wireless communication is automatically performed without a specific setting operation.

SUMMARY OF THE INVENTION

In accordance with some embodiments, a communication apparatus, a communication method by the communication apparatus, and a computer readable recording medium are presented.

In some embodiments, a communication apparatus performs wireless communication with another portable apparatus and transmits content data including image data is presented. The communication apparatus includes: an operation information converting unit that converts a relative position change between the portable apparatus and the communication apparatus into operation information in order to establish wireless communication with the portable apparatus; a transceiving unit that receives the operation information from the portable apparatus; and a transmission control unit that causes the transceiving unit to establish communication for transmitting the content data to the portable apparatus when the operation information received by the transceiving unit matches operation information which is set in advance.

In some embodiments, a communication apparatus performs wireless communication with another portable apparatus and transmits content data including image data. The communication apparatus includes: an imaging unit that images a specified field of view region to generate image data; a setting information extracting unit that extracts setting information included in a setting image generated by the imaging unit for establishing communication; an operation information converting unit that converts a specific position change operation at the time of imaging in the communication apparatus into operation information; and a transceiving unit that transmits the operation information converted by the operation information converting unit to the portable apparatus.

In some embodiments, a communication apparatus, further includes: an imaging unit that images a specified field of view region to generate image data; a setting information extracting unit that extracts setting information included in a setting image generated by the imaging unit for establishing communication; an operation information converting unit that converts a specific position change operation associated with imaging in the communication apparatus into operation information; and a transceiving unit that transmits the operation information converted by the operation information converting unit to the portable apparatus.

In some embodiments, a communication apparatus performs wireless communication with another apparatus and receives content data including image data. The communication apparatus includes: a transceiving unit that receives operation information indicating a relative position change between another apparatus and the communication apparatus from another apparatus in order to establish wireless communication with another apparatus; and a transmission control unit that causes the transceiving unit to establish communication for receiving the content data transmitted from another apparatus when the operation information received by the transceiving unit matches operation information which is set in advance.

In some embodiments, a communication method executed by a communication apparatus that performs wireless communication with another portable apparatus and transmits content data including image data is presented. The communication method includes: displaying communication information; receiving operation information converted according to a specific position change operation associated with display imaging of the portable apparatus, from the portable apparatus; and permitting the content data to be transmitted to the portable apparatus when the received operation information matches setting information which is set in advance.

In some embodiments, a non-transitory computer readable recording medium with an executable program stored thereon is presented. The program instructs a processor, which is disposed in a communication apparatus that performs wireless communication with another portable apparatus and transmits content data including image data, to execute: displaying communication information; receiving operation information converted according to a specific position change operation associated with display imaging of the portable apparatus, from the portable apparatus; and permitting the content data to be transmitted to the portable apparatus when the received operation information matches setting information which is set in advance.

In some embodiments, a communication method between a first apparatus and a second apparatus includes: imaging a code for communication displayed on the second apparatus; determining operation information including a relative position change between the first apparatus and the second apparatus associated with the imaging; and acquiring information from the first apparatus transmitted after the operation information is transmitted.

In some embodiments, a non-transitory computer readable recording medium with an executable program stored thereon is presented. The program instructs a processor, which is disposed in each of a first apparatus and a second apparatus, to execute: imaging a code for communication displayed on the second apparatus; determining operation information including a relative position change between the first apparatus and the second apparatus associated with the imaging; and acquiring information from the first apparatus transmitted after the operation information is transmitted.

In some embodiments, a communication method executed by a communication apparatus that performs wireless communication with another apparatus and receives content data including image data is presented. The communication method includes: receiving, by a transceiving unit, operation information indicating a relative position change between another apparatus and the communication apparatus from another apparatus in order to establish wireless communication with another apparatus; and causing the transceiving unit to establish communication for receiving the content data transmitted from another apparatus when the operation information received by the transceiving unit matches operation information which is set in advance.

In some embodiments, a non-transitory computer readable recording medium with an executable program stored thereon is presented. The program instructs a processor, which is disposed in a communication apparatus that performs wireless communication with another apparatus and receives content data including image data, to execute: receiving, by a transceiving unit, operation information indicating a relative position change between another apparatus and the communication apparatus from another apparatus in order to establish wireless communication with another apparatus; and causing the transceiving unit to establish communication for receiving the content data transmitted from another apparatus when the operation information received by the transceiving unit matches operation information which is set in advance.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
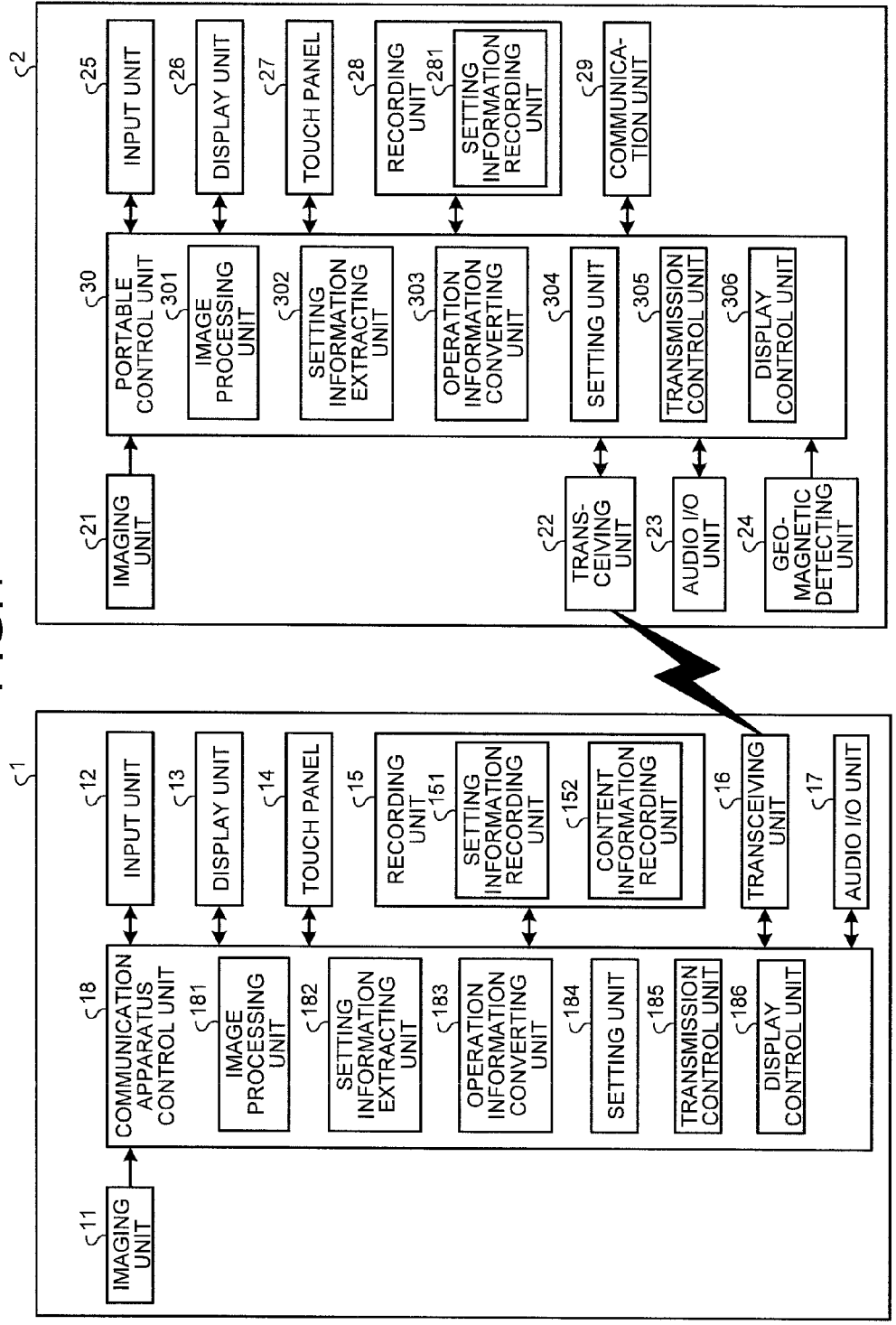
FIG. 1 is a block diagram illustrating configurations of a communication apparatus and a portable apparatus according to a first embodiment of the present invention.

Exemplary embodiments of the present invention will be described with reference to the accompanying drawings. The present invention is not limited to the following embodiments. In the drawings, the same reference numerals are used to indicate the same or similar parts.

First Embodiment

FIG. 1 is a block diagram illustrating a configuration of a communication apparatus and a portable apparatus according to a first embodiment of the present invention. A communication apparatus 1 and a portable apparatus 2 illustrated in FIG. 1 are capable of performing two-way communication of content data including image data and audio data according to a specified wireless communication standard. Here, the example of the specified wireless communication standard include IEEE802.11b, IEEE802.11n, Bluetooth (a registered trademark), and infrared communication standard. In the first embodiment, any of the wireless communication standards can be applied.

First, the communication apparatus 1 will be described. The communication apparatus 1 includes an imaging apparatus such as a digital camera that images a specified field of view region and generates image data. The communication apparatus 1 includes an imaging unit 11, an input unit 12, a display unit 13, a touch panel 14, a recording unit 15, a transceiving unit 16, an audio input/output (I/O) unit 17, and a communication apparatus control unit 18.

The imaging unit 11 includes an optical system that is configured with one or more lenses and collects light from a specified field of view region, a diaphragm that adjust the incident amount of light collected by the optical system, a shutter that operates according to an input of a release signal, an imaging element of a charge coupled device (CCD) type or a complementary metal oxide semiconductor (CMOS) that receives light having passed the diaphragm and the shutter and converts the received light into an electric signal, and a signal processing unit that performs an analog process such as a noise reduction process and a gain-up process and A/D conversion on an analog signal output from the imaging element, and outputs the AD conversion result to the communication apparatus control unit 18.

The input unit 12 includes a power switch that receives an input an instruction signal for instructing power-on or power off of the communication apparatus 1, a release switch that receives an input of a release signal instructing the communication apparatus 1 to perform shooting, a selector switch that receives an input of a switching signal for instructing switching of various modes of the communication apparatus, and an operating switch that receives an input of an operation signal for changing setting of various kinds of parameters of the communication apparatus 1.

The display unit 13 includes a display panel including a liquid crystal display (LCD) or an organic electro luminescence (EL) element. The display unit 13 displays an image corresponding to image data recorded in the recording unit 15. Here, examples of the image display includes a rec view display in which immediately captured image data is displayed during only a given period of time (for example, 3 seconds), a playback display in which image data recorded in the recording unit 15 is displayed, and a live view image display in which a live view image corresponding to image data consecutively generated by the imaging unit 11 is sequentially displayed in time series. Further, the display unit 13 appropriately displays operation information of the communication apparatus 1 and information related to shooting such as an exposure value and a diaphragm value.

The touch panel 14 is disposed on a display screen of the display unit 13. The touch panel 14 detects a touch of an external object, and outputs a positional signal corresponding to the detected touch position to the communication apparatus control unit 18. Further, the touch panel 14 may detect the position that the user touches based on information displayed on the display unit 13 and receive an input of an instruction signal for instructing an operation to be performed by the communication apparatus 1 according to the detected touch position. Generally, as the touch panel 14, there are a resistive type touch panel, a capacitive type touch panel, an optical sensing type touch panel, and the like. In the first embodiment, a touch panel of any of the types can be applied.

The recording unit 15 includes a semiconductor memory such as a flash memory or a dynamic random access memory (DRAM). The recording unit 15 records various kinds of programs of operating the communication apparatus 1 and various kinds of data and parameters used during execution of a program. The recording unit 15 includes a setting information recording unit 151 that records setting information including identification information of the communication apparatus 1 necessary for wireless communication with the portable apparatus 2, a password corresponding to the identification information, and operation information for permitting transmission of content data according to a specific operation of the portable apparatus 2 and a content information recording unit 152 that records content data including image data or audio data generated by the imaging unit 11. The recording unit 15 may have a function of a recording medium interface that records information in a recording medium such as a memory card mounted from the outside of the communication apparatus 1 and reads information recorded by the recording medium.

The transceiving unit 16 performs wireless communication with the portable apparatus 2 according to a specified wireless communication standard, transmits content data to the portable apparatus 2, and receives setting information converted according to a specific operation performed in the portable apparatus 2 from the portable apparatus 2. The transceiving unit 16 includes a communication device that performs two-way communication of content data or various kinds of information. The communication device includes an antenna that transmits/receives a radio signal to/from another apparatus, a transceiving circuit that performs a demodulation process on the signal received by the antenna and performs a modulation process on a signal to be transmitted, and the like. The transceiving unit 16 transmits a communication signal including identification information notifying the presence thereof at regular intervals when the communication apparatus 1 starts up, receives a communication signal transmitted from the portable apparatus 2 or another apparatus, is recovered from a suspension state or a standby state, and establishes communication with the portable apparatus 2 or another apparatus.

The audio I/O unit 17 includes a microphone, a speaker, and the like. The audio I/O unit 17 acquires audio data, and outputs the acquired audio data to the communication apparatus control unit 18. The audio I/O unit 17 plays back and outputs audio data of content data recorded in the recording unit 15.

The communication apparatus control unit 18 includes a central processing unit (CPU) and the like. The communication apparatus control unit 18 controls an operation of the communication apparatus 1 in general by giving a corresponding instruction or transferring data to the components configuring the communication apparatus 1 according to an instruction signal, a switching signal, or the like from the input unit 12 or the touch panel 14.

A detailed configuration of the communication apparatus control unit 18 will be described. The communication apparatus control unit 18 includes an image processing unit 181, a setting information extracting unit 182, an operation information converting unit 183 that converts a relative position change between apparatuses communicating with each other into operation information, a setting unit 184, a transmission control unit 185, and a display control unit 186.

The image processing unit 181 includes an image engine (an image controller), and executes various kinds of image processing on image data input from the imaging unit 11 and outputs the image processing result to the recording unit 15 or the display unit 13. The image processing unit 181 performs image processing including at least a gain process of adjusting brightness of an image, a gradation correction process of correcting a gradation, an edge process, a white balance process, a color correction process, and a γ correction process on image data. The image processing unit 181 may compress image data according to the Joint Photographic Experts Group (JPEG) scheme and then causes the compressed image data to be recorded in the recording unit 15.

The setting information extracting unit 182 extracts setting information for establishing wireless communication with the portable apparatus 2 from a specified image to be displayed on the portable apparatus 2 which will be described below. Specifically, the setting information extracting unit 182 extracts setting information used to perform wireless communication with the portable apparatus 2, such as identification information (apparatus address) of the portable apparatus 2 and a password corresponding to identification information, from 2D bar code image including a QR code (a registered trademark) image or a bar code image displayed on the portable apparatus 2.

The operation information converting unit 183 converts a specific operation performed by the communication apparatus 1 into operation information for receiving content data from the portable apparatus 2.

The setting unit 184 sets operation information for permitting transmission of content data according to a specific operation of the portable apparatus 2, identification information of the communication apparatus 1 necessary for wireless communication with the portable apparatus 2, and a password corresponding to the identification information according to an instruction signal input from the input unit 12. Specifically, the setting unit 184 sets the operation information performed by the portable apparatus 2 according to an instruction signal input from the input unit 12, for example, an instruction signal selected from among a plurality of specific operations designated to the portable apparatus 2 which is designated in advance. Further, as the user operates an operating switch of the input unit 12 or the like, the setting unit 184 sets a password corresponding to the identification information of the communication apparatus 1 necessary for wireless communication with the portable apparatus 2 according to an instruction signal input from the input unit 12. In addition, the setting unit 184 records the set operation information in the setting information recording unit 151.

The transmission control unit 185 causes the transceiving unit 16 to transmit content data to the portable apparatus when the operation information from the portable apparatus 2 received by the transceiving unit 16 matches operation information of setting information recorded in the setting information recording unit 151.

The display control unit 186 causes an image corresponding to image data to be displayed on the display unit 13. The display control unit 186 causes a setting image corresponding to the setting information recorded in the setting information recording unit 151 to be displayed on the display unit 13. Specifically, the display control unit 186 causes the setting image corresponding to the setting information such as a 2D bar code image including a QR code image or a bar code image to be displayed on the display unit 13. A setting text for establishing communication, a symbol, a text, a sound, a sign, or a character may be used as the setting image.

The communication apparatus 1 having the above configuration may have a communication function capable of performing two-way communication with a personal computer (not illustrated) via the Internet.

Next, the portable apparatus 2 will be described. The portable apparatus 2 includes a multi-functional mobile phone that performs two-way wireless communication with a network or an external communication station. The portable apparatus 2 includes an imaging unit 21, a transceiving unit 22, an audio I/O unit 23, a geomagnetic detecting unit 24, an input unit 25, a display unit 26, a touch panel 27, a recording unit 28, a communication unit 29, and a portable control unit 30. The imaging unit 21, the transceiving unit 22, the audio I/O unit 23, the input unit 25, the display unit 26, and the touch panel 27 have the same configurations as the imaging unit 11, the transceiving unit 16, the audio I/O unit 17, the input unit 12, the display unit 13 and the touch panel 14 of the communication apparatus 1, respectively, and thus a description thereof will not be made.

The geomagnetic detecting unit 24 includes a magnetic director sensor, and detects a designated direction which is set to the portable apparatus 2 in advance. Specifically, the geomagnetic detecting unit 24 detects a direction of the portable apparatus 2 when an upward direction from the center of a display screen of the display unit 26 is used as a reference direction by detecting geomagnetic components in the vertical direction and the horizontal direction when the display unit 26 is in the horizontal state.

The recording unit 28 includes a semiconductor memory such as a flash memory or a DRAM. The recording unit 28 records various kinds of programs for operating the portable apparatus 2 and various kinds of data and parameters which are used during execution of the programs. The recording unit 28 includes a setting information recording unit 281 that records setting information including identification information of the communication apparatus 1 necessary for wireless communication with the communication apparatus 1 and a password corresponding to the identification information.

The communication unit 29 is a communication interface for performing two-way communication with an external apparatus such as another portable apparatus or a personal computer via a network.

The portable control unit 30 includes a CPU or the like. The portable control unit 30 controls an operation of the portable apparatus 2 in general by giving a corresponding instruction or transferring data to the components configuring the portable apparatus 2 according to an instruction signal, a switching signal, or the like from the input unit 25 or the touch panel 27.

A detailed configuration of the portable control unit 30 will be described. The portable control unit 30 includes an image processing unit 301, a setting information extracting unit 302, an operation information converting unit 303 that uses a relative position change between apparatuses communicating with each other as operation information, a setting unit 304, a transmission control unit 305, and a display control unit 306.

The image processing unit 301 includes an image engine, and executes various kinds of image processing on image data input from the imaging unit 21 and outputs the image processing result to the recording unit 28 or the display unit 26. The image processing unit 301 performs image processing including at least a gain process of adjusting brightness of an image, a gradation correction process of correcting a gradation, an edge process, a white balance process, a color correction process, and a γ correction process on image data. The image processing unit 301 may compress image data according to the JPEG scheme and then causes the compressed image data to be recorded in the recording unit 28.

The setting information extracting unit 302 extracts setting information for establishing wireless communication with the communication apparatus 1 from a specified image to be displayed on the communication apparatus 1.

The operation information converting unit 303 converts a specific operation in the portable apparatus 2 into operation information for establishing wireless communication with the communication apparatus 1. Specifically, when the portable apparatus 2 performs a specific operation designated by the communication apparatus 1, the operation information converting unit 303 analyzes the operation performed by the portable apparatus 2, and converts the operation into operation information for causing the communication apparatus 1 to transmit content data.

The setting unit 304 sets operation information for permitting transmission of content data according to a specific operation of the communication apparatus 1, identification information of the portable apparatus 2 necessary for wireless communication with the communication apparatus 1, and a password corresponding to the identification information according to an instruction signal input from the input unit 25. Further, as the user operates an operating switch of the input unit 25 or the like, the setting unit 304 sets a password corresponding to the identification information of the portable apparatus 2 necessary for wireless communication with the communication apparatus 1 according to an instruction signal input from the input unit 25.

The transmission control unit 305 causes the transceiving unit 22 to transmit content data to the communication apparatus 1 when the operation information from the communication apparatus 1 received by the transceiving unit 22 matches operation information recorded by the setting information recording unit 281.

The display control unit 306 causes an image corresponding to image data to be displayed on the display unit 26. The display control unit 306 causes a setting image corresponding to the setting information recorded in the setting information recording unit 281 to be displayed on the display unit 26. Specifically, the display control unit 306 causes the setting image corresponding to the setting information to be displayed on the display unit 26.

The portable apparatus 2 having the above configuration may have a flash mechanism that irradiates fill light toward a specified field of view region.

Figure 2:
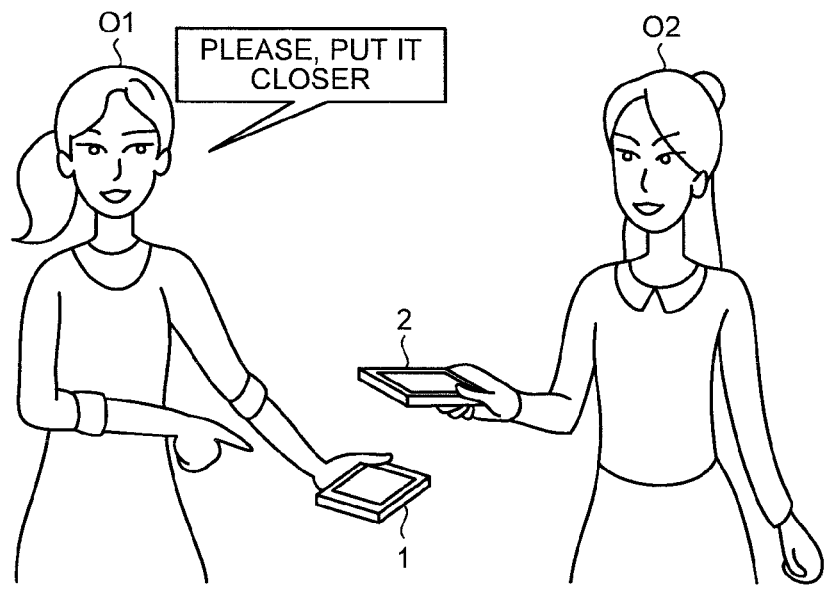
FIG. 2 is a diagram for describing an outline of a communication process executed by the communication apparatus and the portable apparatus according to the first embodiment of the present invention.
Figure 3:
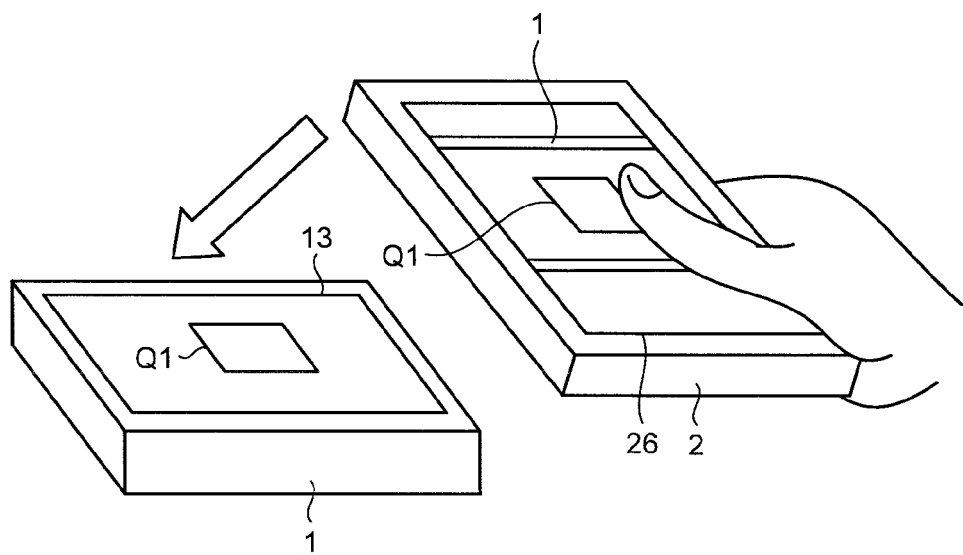
FIG. 3 is a diagram for schematically describing a state of FIG. 2.

FIG. 2 is a diagram for describing an outline of a communication process executed by the communication apparatus 1 and the portable apparatus 2. FIG. 3 is a diagram for schematically describing a state of FIG. 2. In FIGS. 2 and 3, the communication apparatus 1 remains set to a playback mode in which image data recorded in the recording unit 15 is played back and displayed, and the portable apparatus 2 remains set to a shooting mode in which image data is generated by the imaging unit 21.

As illustrated in FIG. 2, in the case in which the communication apparatus 1 performs wireless communication with the portable apparatus 2 according to a specified wireless communication standard to transmit content data, when the portable apparatus 2 performs a specific operation set by the setting unit 184, the communication apparatus 1 establishes wireless communication with the portable apparatus 2 and transmits content data. Specifically, in this embodiment, as illustrated in FIGS. 2 and 3, when the portable apparatus 2 gradually approaches while capturing the QR code image Q1 displayed on the display unit 13 of the communication apparatus 1, the communication apparatus 1 establishes wireless communication with the portable apparatus 2, and transmits content data. For example, when a user O1 tells a user O2 that the user O2 makes the portable apparatus 2 approach and so the user O2 causes the portable apparatus 2 to gradually approaches the communication apparatus 1 while shooting through the portable apparatus 2, it is regarded that a consensus is made between the users, and the communication apparatus 1 establishes wireless communication with the portable apparatus 2 and transmits content data. At this time, the setting unit 184 sets the operation selected by the user O1 operating the input unit 12 as operation information (password) for establishing wireless communication with the portable apparatus 2 and transmitting content data.

Figure 4A:
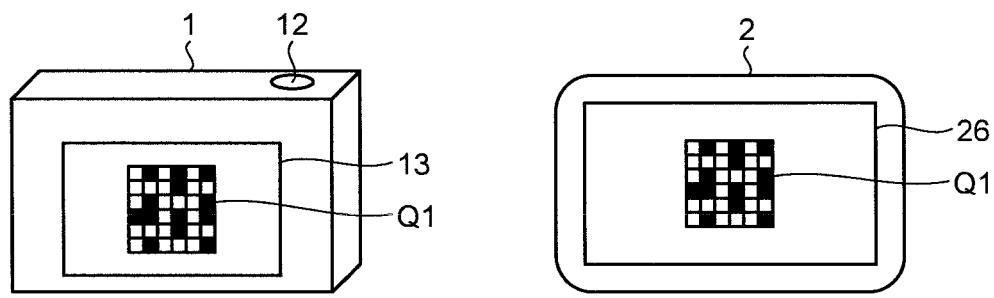
FIGS. 4A and 4B are diagrams illustrating a state when wireless communication is established between the communication apparatus and the portable apparatus according to the first embodiment of the present invention.
Figure 4B:
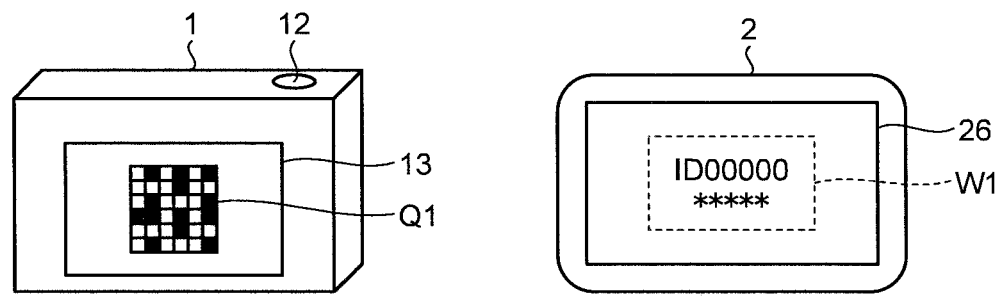
Figure 5A:
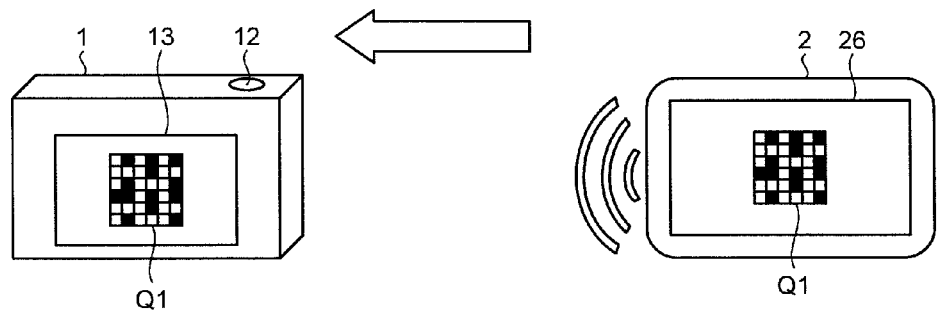
FIGS. 5A to 5C are diagrams for describing a state when the communication apparatus transmits content data after the wireless communication is established between the communication apparatus and the portable apparatus according to the first embodiment of the present invention.
Figure 5B:
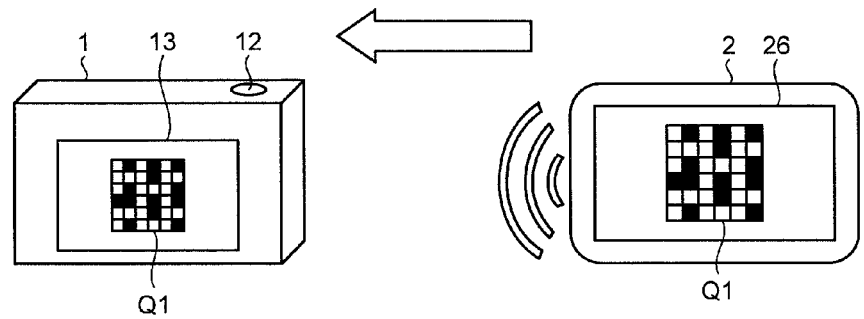
Figure 5C:
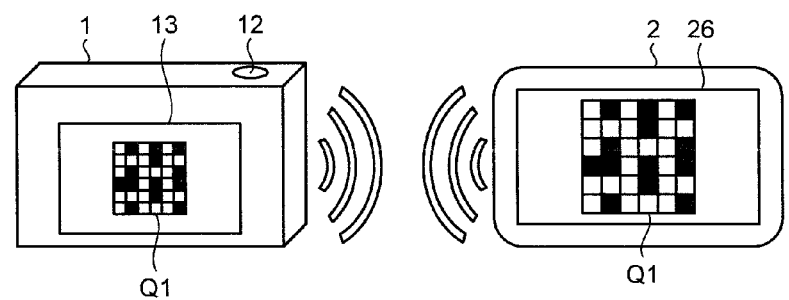

FIGS. 4A and 4B are diagrams illustrating a state when wireless communication is established between the communication apparatus 1 and the portable apparatus 2. FIGS. 5A to 5C are diagrams illustrating a state when the communication apparatus 1 transmits content data after wireless communication is established between the communication apparatus 1 and the portable apparatus 2.

As illustrated in FIGS. 4A and 4B, first, the communication apparatus 1 causes a QR code image Q1 corresponding to setting information for performing wireless communication with the portable apparatus 2 according to a specified wireless communication standard to be displayed on the display unit 13. At this time, the portable apparatus 2 images the QR code image Q1 displayed on the display unit 13 of the communication apparatus 1 through the imaging unit 21 (FIG. 4A). Next, the setting information extracting unit 302 of the portable apparatus 2 extracts setting information W1 including the identification information of the communication apparatus 1 and a password corresponding to the identification information included in the QR code image Q1 imaged by the imaging unit 21, and the display control unit 306 causes the setting information W1 to be displayed on the display unit 26 (FIG. 4B). Then, the portable apparatus 2 transmits the password to the communication apparatus 1. As a result, wireless communication is established between the communication apparatus 1 and the portable apparatus 2.

Thereafter, as illustrated in FIGS. 5A to 5C, in the case in which the specific operation set by the setting unit 184 is an operation bringing the portable apparatus 2 to close to the communication apparatus 1, when the display area of the QR code image Q1 imaged by the imaging unit 21 in the display unit 26 gradually increases as the portable apparatus 2 approaches the communication apparatus 1 (FIG. 5A→FIG. 5B), the portable apparatus 2 matches the specific operation set by the setting unit 184. At this time, the operation information converting unit 303 of the portable apparatus 2 converts the operation of approaching the communication apparatus 1 into operation information serving as a password used to permit transmission of content data based on the image data captured by the imaging unit 21, and transmits the converted operation information to the communication apparatus 1 (FIG. 5B). Thereafter, when the operation information transmitted from the portable apparatus 2 matches the operation information included in the setting information, the communication apparatus 1 transmits the content data to the portable apparatus 2 (FIG. 5C). However, when the operation information transmitted from the portable apparatus 2 does not match the operation information included in the setting information, the communication apparatus 1 does not transmit the content data to the portable apparatus 2. The operation information converting unit 303 may convert the operation performed by the portable apparatus 2 into a password used to establish wireless communication with the communication apparatus 1, and may include an encrypted password in the QR code image and use the operation information as decryption information used for description. In addition to an operation such as approaching, the operation information preferably accompanies a change in a captured image such as rotation, inclination, or keeping away, and basically, the user only needs to integrate an operation into a QR code based on an operation such as framing by a camera of an apparatus. In the case of the same approaching operation, the operation information may be differently determined according to whether approaching is slow or fast or whether or it keeps away after approaching. Of course, a time taken for imaging or a temporal transition may be used. The operation information is based on a relative position change among a plurality of apparatuses performing communication with each other which is obtained between mobile devices other than a switch operation of an apparatus.

As described above, the user can receive content data by performing the designated specific operation through the portable apparatus 2. Further, since the operation information serving as the password for establishment of communication differs from that for transmission of content data, even though the QR code image Q1 is captured by a third person, the communication apparatus 1 does not transmit content data unless the communication apparatus 1 performs the specific operation, and thus the security is high.

Figure 6:
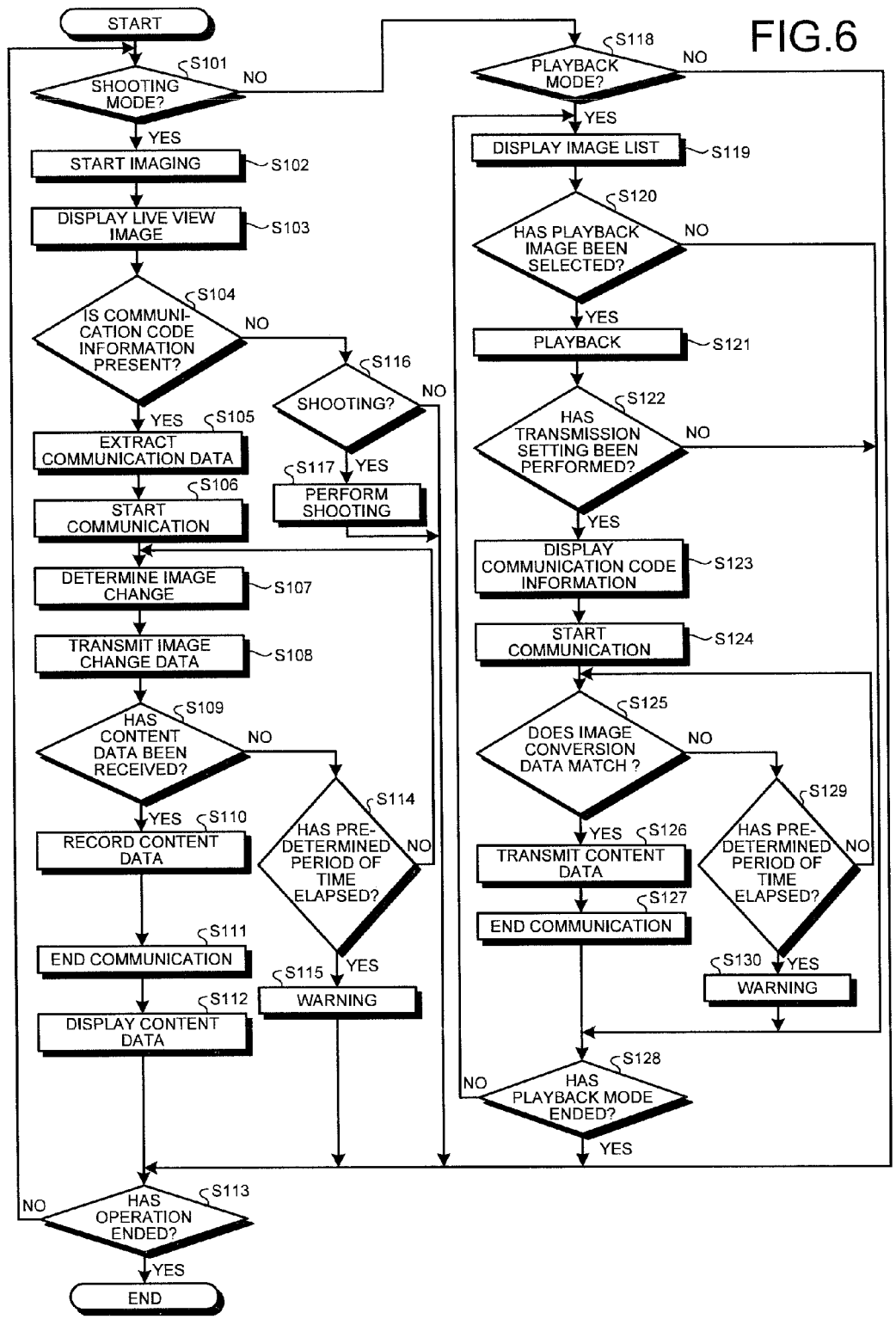
FIG. 6 is a flowchart illustrating an outline of a process executed by the communication apparatus according to the first embodiment of the present invention.

Next, an outline of a process executed by the communication apparatus 1 will be described. FIG. 6 is a flowchart illustrating an outline of a process executed by the communication apparatus 1. The same process as in the flowchart illustrated in FIG. 6 may be performed by the portable apparatus 2.

The description will proceed in connection with an example in which the communication apparatus 1 is set to the shooting mode (Yes in step S101) as illustrated in FIG. 6. In this case, the communication apparatus 1 starts imaging (step S102), the display control unit 186 causes a live view image imaged by the imaging unit 11 to be displayed on the display unit 13 (step S103).

Then, the communication apparatus control unit 18 determines whether or not communication code information serving as setting information is present in the live view image (step S104). Specifically, when the portable apparatus 2 displays the QR code image Q1 through the display unit 26, the communication apparatus control unit 18 images the QR code image Q1 through the imaging unit 11 and determines whether or not the QR code image Q1 is present in the live view image. When the communication apparatus control unit 18 determines whether or not the communication code information serving as the setting information is present in the live view image (Yes in step S104), the communication apparatus 1 causes the process to proceed to step S105 which will be described later. However, the communication apparatus control unit 18 determines whether or not the communication code information serving as the setting information is not present in the live view image (No in step S104), the communication apparatus 1 causes the process to proceed to step S116 which will be described later.

In step S105, the setting information extracting unit 182 extracts setting information for performing wireless communication with the portable apparatus 2 which is included in the communication code information serving as the setting information.

Then, the transmission control unit 185 starts wireless communication with the portable apparatus 2 according to the setting information extracted by the setting information extracting unit 182 and a wireless communication standard (step S106).

Thereafter, the operation information converting unit 183 determines a change in the QR code image Q1 in the live view image corresponding to the image data consecutively imaged by the imaging unit 11 (step S107). Specifically, the operation information converting unit 183 determines whether or not the QR code image Q1 in the live view image corresponding to the image data consecutively imaged by the imaging unit 11 changes according to the specific operation designated by the setting unit 304, for example, whether or not the region of the QR code image Q1 on the display unit 13 has increased as the communication apparatus 1 approaches the portable apparatus 2 while imaging the QR code image Q1 displayed on the display unit 26 of the portable apparatus 2, and converts the determination result into operation information for receiving content data from the portable apparatus 2. At this time, the operation information is determined based on the change in the size of the image, but may be determined based on an insertion position of a display unit, a position change, image rotation, or the like, and may be determined using acceleration or geomagnetic information. Further, imaging time information may be used. The operation information is based on a relative position change between a plurality of apparatuses performing communication with each other which is obtained between mobile devices other than a switch operation of an apparatus. When code information is acquired by shooting, subsequent operation information may be used. In this case, the present invention is not limited to shooting, and an acceleration change or a direction change subsequent to shooting is preferably determined. By generating light or a sound, the distance may be determined based on reflection of light or a sound, reception of a sound, or the like. When a series of motions are associated with shooting, the method includes a series of motions, and fast communication can be maintained.

Then, the transmission control unit 185 transmits image conversion data determined and converted by the operation information converting unit 183 to the portable apparatus 2 through a transceiving unit 16 (step S108).

Thereafter, the communication apparatus control unit 18 determines whether or not the content data has been received from the portable apparatus 2 (step S109). When it is determined that the content data has been received from the portable apparatus 2 (Yes in step S109), the received content data is recorded in the recording unit 15 (step S110).

Then, the transmission control unit 185 ends wireless communication with the portable apparatus 2 (step S111), and the display control unit 186 causes an image corresponding to the content data to be displayed on the display unit 13 (step S112). At this time, when the content data is music data, the audio I/O unit 17 plays back (outputs) audio data.

Thereafter, the communication apparatus control unit 18 determines whether or not the shooting operation of the playback operation of the communication apparatus 1 has ended (step S113) as the communication apparatus 1 enters a power-off state or the communication apparatus 1 enters a standby state. When the communication apparatus control unit 18 determines that the shooting operation of the playback operation of the communication apparatus 1 has ended (Yes in step S113), the communication apparatus 1 ends the present process. However, when the communication apparatus control unit 18 determines that the shooting operation of the playback operation of the communication apparatus 1 has not ended (No in step S113), the communication apparatus 1 returns to step S101.

When it is determined in step S109 that the content data has not been received from the portable apparatus 2 (No in step S109), the communication apparatus control unit 18 determines whether or not a given period of time (for example, 5 seconds) has elapsed (step S114). When the communication apparatus control unit 18 determines that the given period of time has not elapsed (No in step S114), the communication apparatus 1 returns to step S107. When the communication apparatus control unit 18 determines that the given period of time has elapsed (Yes in step S114), the communication apparatus 1 causes the process to proceed to step S115.

Then, the display control unit 186 causes a warning representing that the content could not been received from the portable apparatus 2 or a warning representing that the portable apparatus 2 has not performed the specific operation designated by the communication apparatus 1 to be displayed on the display unit 13 (step S115). Thereafter, the communication apparatus 1 causes the process to proceed to step S113.

When it is determined in step S116 that a release signal has been input through the input unit 12 (Yes in step S116), the communication apparatus 1 executes shooting (step S117). Specifically, the communication apparatus 1 performs a process of generating image data to be generated by causing the imaging unit 11 to execute the shooting operation, causing the image processing unit 181 to execute image processing on the image data, and recording the image processing result in the recording unit 15. Thereafter, the communication apparatus 1 causes the process to proceed to step S113. However, when it is determined that the release signal has not been input through the input unit 12 (No in step S116), the communication apparatus 1 causes the process to proceed to step S113.

Next, an example in which the communication apparatus 1 is not set to the shooting mode (No in step S101) but the communication apparatus 1 is set to the playback mode (Yes in step S118) will be described. In this case, the display control unit 186 causes images (thumbnail images) respectively corresponding a plurality of pieces of image data recorded by the recording unit 15 to be listed and displayed on the display unit 13 (step S119).

Then, when a playback image to be enlarged and played back is selected from the list of the displayed images (Yes in step S120), the display control unit 186 enlarges and plays back the selected image (step S121). However, when a playback image to be enlarged and played back is selected from the list of the displayed images within a given period of time (No in step S120), the communication apparatus 1 causes the process to proceed to step S128 which will be described later.

In step S122, the communication apparatus control unit 18 determines whether or not transmission setting for transmitting the content data recorded by the recording unit 15 to the portable apparatus 2 has been performed. Specifically, it is determined whether or not an instruction signal for transmitting the content data recorded by the recording unit 15 to the portable apparatus 2 has been input through the input unit 12. When the communication apparatus control unit 18 determines that the transmission setting for transmitting the content data recorded by the recording unit 15 to the portable apparatus 2 has been performed (Yes in step S122), the communication apparatus 1 causes the process to proceed to step S123 which will be described later. However, when the communication apparatus control unit 18 determines that the transmission setting for transmitting the content data recorded by the recording unit 15 to the portable apparatus 2 has not been performed (No in step S122), the communication apparatus 1 causes the process to proceed to step S128 which will be described later.

In step S123, the display control unit 186 causes the communication code information serving as the setting information recorded by the setting information recording unit 151 of the recording unit 15 to be displayed on the display unit 13. Specifically, the display control unit 186 causes the QR code image Q1 corresponding to the communication code information to be displayed on the display unit 13.

Then, the transmission control unit 185 starts wireless communication with the portable apparatus 2 according to a specified wireless communication standard (step S124).

Thereafter, the transmission control unit 185 determines whether or not the image conversion data serving as the operation information received from the portable apparatus 2 matches image conversion data corresponding to the designated specific operation (step S125). When the transmission control unit 185 determines that the image conversion data serving as the operation information received from the portable apparatus 2 matches image conversion data corresponding to the designated specific operation (Yes in step S125), it is determined that an input corresponding to a password has been made, and so the transmission control unit 185 transmits the content data recorded by the recording unit 15 to the portable apparatus 2 through the transceiving unit 16 (step S126). At this time, the transmission control unit 185 may transmit only image data (including video data) currently displayed on the display unit 13 to the portable apparatus 2. Here, the above description has been made in connection with the example in which the operation information is converted into the password by the operation information converting unit 183 of the communication apparatus 1, but the portable apparatus 2 may have the operation information converting function, and the operation information converting unit 303 may convert the operation information into the password and then transmits the password. Further, the operation information may not be converted into the password and may be used as key information used to decrypt the encrypted password. The operation information converting unit 183 may have the decompression function, and the operation information converting unit 303 of the portable apparatus 2 may have the decompression function. When the encrypted password is used, even when the password is displayed on the QR code, the security is maintained. Particularly, even though not described, an ID as well as a password may be encrypted. In other words, the apparatus 1 converts an encrypted password into a QR code and displays the QR code, and only the portable apparatus 2 that reads the QR code can decrypt the ID and the password or the password and input the decrypted ID and password or the decrypted password to the apparatus 1. Using the QR code which is easily read, a communication specification having high security can be provided. Of course, content may be encrypted and then transmitted using the description information obtained as described above. When content is encrypted, a use application in which an ID or a password needs not be encrypted may be considered.

Thereafter, the transmission control unit 185 ends wireless communication with the portable apparatus 2 (step S127). Thereafter, the communication apparatus control unit 18 determines whether or not the playback mode has ended (step S128). When the communication apparatus control unit 18 determines that the playback mode has ended (Yes in step S128), the communication apparatus 1 causes the process to proceed to step S113. However, when the communication apparatus control unit 18 determines that the playback mode has not ended (No in step S128), the communication apparatus 1 returns to step S119.

When the transmission control unit 185 determines in step S125 that the image conversion data serving as the operation information received from the portable apparatus 2 does not match the image conversion data corresponding to the designated specific operation (No in step S125), the communication apparatus control unit 18 determines whether or not a given period of time has elapsed (step S129). When the communication apparatus control unit 18 determines that the given period of time has not elapsed (No in step S129), the communication apparatus 1 causes the process to return step S125. However, when the communication apparatus control unit 18 determines that the given period of time has elapsed (Yes in step S129), the communication apparatus 1 causes the process to proceed to step S130.

Thereafter, the display control unit 186 causes a warning representing that the communication apparatus 1 has not performed the specific operation designated by the portable apparatus 2, for example, an operation of bringing the communication apparatus 1 to close to the portable apparatus 2 to be displayed on the display unit 13 (step S130). Thereafter, the communication apparatus 1 causes the process to proceed to step S128.

When it is determined in step S118 that the communication apparatus 1 does not remain set to the playback mode (No in step S118), the communication apparatus 1 causes the process to proceed to step S113.

According to the above-described first embodiment of the present invention, when the operation information converted according to the specific operation of the portable apparatus 2 received by the transceiving unit 16 matches the operation information for receiving the content data from the portable apparatus 2 set by the setting unit 184, the transmission control unit 185 causes the content data to be transmitted to the portable apparatus 2. Thus, the security is excellent, and it is possible to perform two-way wireless communication with another external apparatus by an easy operation.

Further, according to the first embodiment, the present invention can be simply applied to communication establishment based on an apparatus ID (identification information) and a password used in many communication standards, an ID of an apparatus can be simply acquired, a password used to transmit content data can be freely set by a promise of a place between users, and the security can be increased. Actually, one promise of the place may be used, and the security is increased according to whether or not the user O1 gives information. When the information is not given, the specified operation information is not satisfied, and communication is not performed. Of course, the specified operation information may be changed by determining the user's voice acquired by the audio I/O unit 17. In other words, when "approach" is uttered, communication is preferably performed when approached, and when "turn" is uttered, communication is preferably performed when turned. This operation is not limited to rotation and based on a relative position change among a plurality of apparatuses performing communication with each other which is obtained between mobile devices other than a switch operation of an apparatus.

Further, according to the first embodiment, the directivity and the security can be increased by a shooting angle or a display angle of view using an image imaging signal.

In addition, according to the first embodiment, a display image can be changed, and variety of a simple operation can be changed and increased at that place by increasing a degree of freedom of a communication establishing operation. Thus, an operation can be selected according to a situation, an operation of establishing wireless communication can be very simplified, and the security can be increased.

Further, according to the first embodiment, since transmission and reception of content data are performed by a change of an image, the directivity can be enhanced, and the security can be increased.

Further, in the first embodiment, a setting image used to establish wireless communication may differ from an image captured to transmit content data. In this case, a simple image such as a diagram or a text may be used as an image for permitting transmission of content data. In this case, the communication apparatus 1 can easily determine the operation information received from the portable apparatus 2.

Further, in the first embodiment, the setting unit 184 and the setting unit 304 record the operation information and the password in the setting information recording unit 151 and the setting information recording unit 281, respectively, but the operation information may not be recorded. In this case, the setting unit 184 or the setting unit 304 may set the operation information while the user is pushing down the input unit 12, for example, only when a switch such as an operating switch or an operation dial remains in a pushed state. In this case, the security can be further increased.

Second Embodiment

Next, a second embodiment of the present invention will be described. A communication apparatus and a portable apparatus according to the second embodiment have the same configuration as in the above-described embodiment but differ from the above-described embodiment in a specific operation and process for transmitting and receiving content data. Thus, in the following, a specific operation when the communication apparatus and the portable apparatus according to the second embodiment transmit and receive content data will be first described, and then the process executed by the communication apparatus and the portable apparatus according to the second embodiment will be described. The same components as in the first embodiment are denoted by the same reference numerals.

Figure 7:
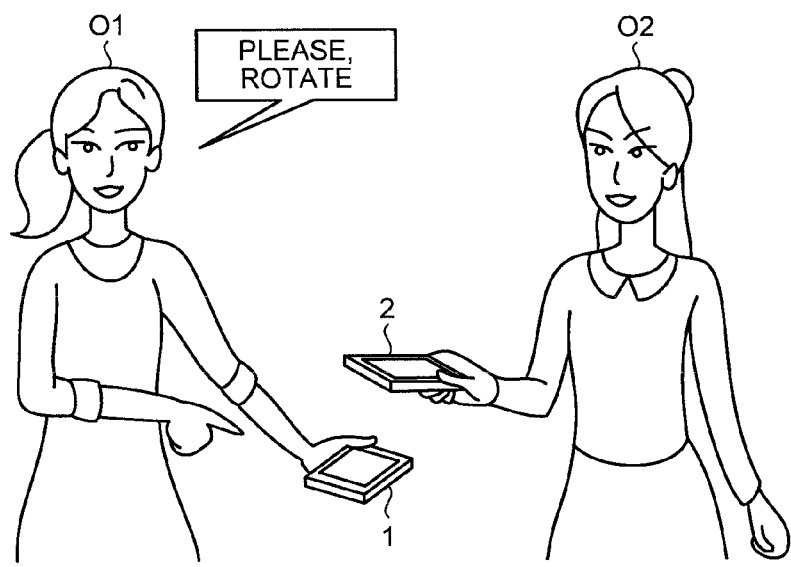
FIG. 7 is a diagram for describing an outline of a communication process executed by a communication apparatus and a portable apparatus according to a second embodiment of the present invention.
Figure 8:
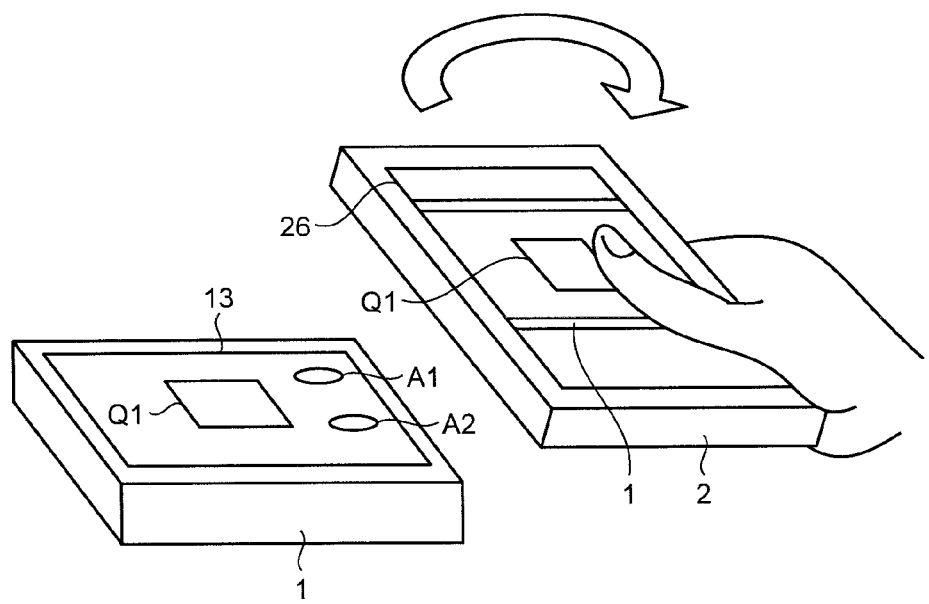
FIG. 8 is a diagram for schematically describing a state of FIG. 7.

FIG. 7 is a diagram for describing an outline of a communication process executed by the communication apparatus 1 and the portable apparatus 2. FIG. 8 is a diagram for schematically describing a state of FIG. 7. In FIGS. 7 and 8, the communication apparatus 1 remains set to the playback mode in which content data including image data recorded in the recording unit 15 is played back and transmitted, and the portable apparatus 2 remains set to the shooting mode.

As illustrated in FIG. 7, in the case in which wireless communication with the portable apparatus 2 is performed according to a specified wireless communication standard to transmit content data, the communication apparatus 1 establishes wireless communication with the portable apparatus 2 and transmits content data when the portable apparatus 2 performs the specific operation set by the setting unit 184. Specifically, as illustrated in FIGS. 7 and 8, the communication apparatus 1 establishes wireless communication with the portable apparatus 2 and transmits content data when the portable apparatus 2 rotates. For example, when the user O1 tells the user O2 that the user O2 rotates the portable apparatus 2 and then the user O2 rotates the portable apparatus 2, the communication apparatus 1 establishes wireless communication with the portable apparatus 2 and transmits content data. On the other hand, when the user O2 does not perform an operation of rotating the portable apparatus 2, for example, when the user O2 performs an operation of brining the portable apparatus 2 to close, the communication apparatus 1 does not transmit content data. At this time, the operation information is based on rotation, but may be determined based on a change in the size of an image, may be determined based on an insertion position of a display unit or a position change, or may be determined using acceleration or geomagnetic information. Further, imaging time information may be used. The operation information is based on a relative position change among a plurality of apparatuses performing communication with each other which is obtained between mobile devices other than a switch operation of an apparatus.

Figure 9A:
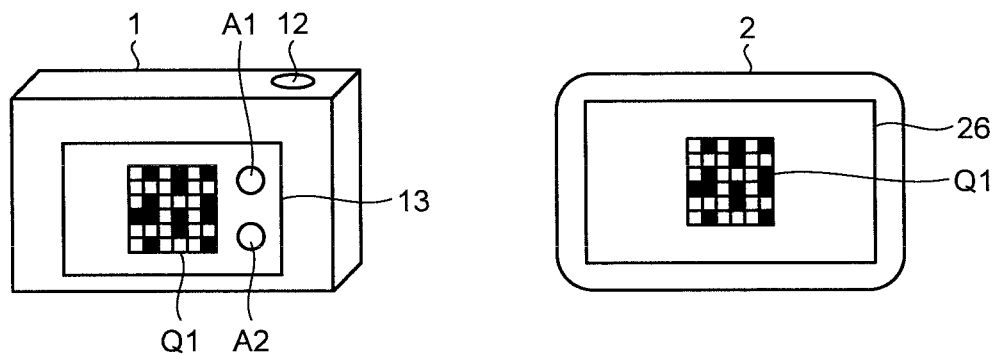
FIGS. 9A and 9B are diagrams for schematically describing a state when wireless communication is established between the communication apparatus and the portable apparatus according to the second embodiment of the present invention.
Figure 9B:
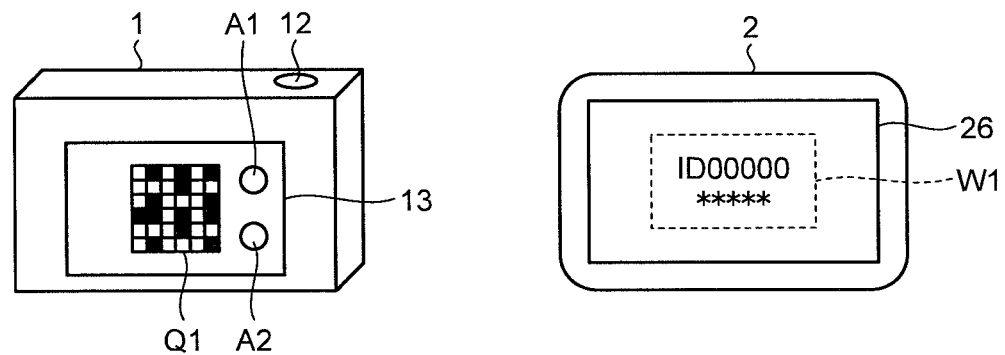
Figure 10A:
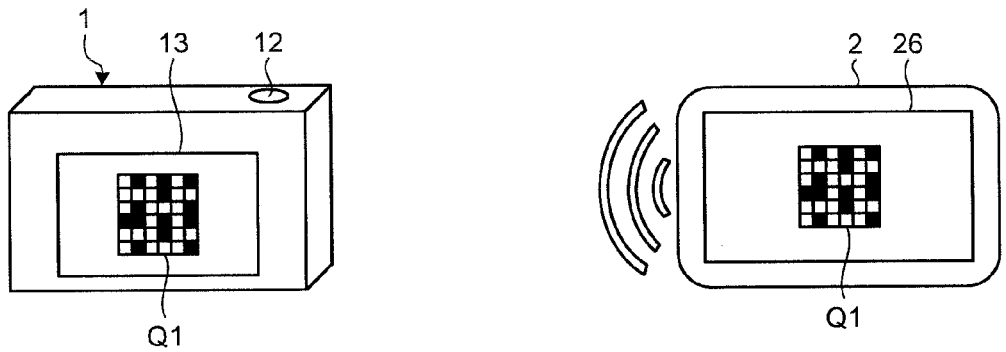
FIGS. 10A to 10D are diagrams for describing a state when the communication apparatus transmits content data to the portable apparatus after wireless communication is established between the communication apparatus and the portable apparatus according to the second embodiment of the present invention.
Figure 10B:
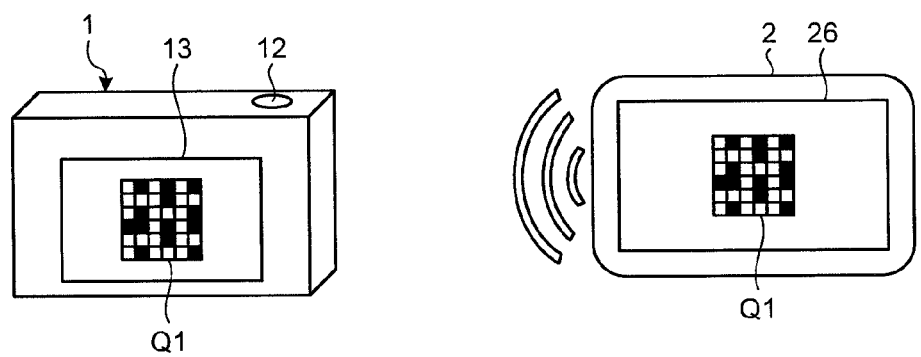
Figure 10C:
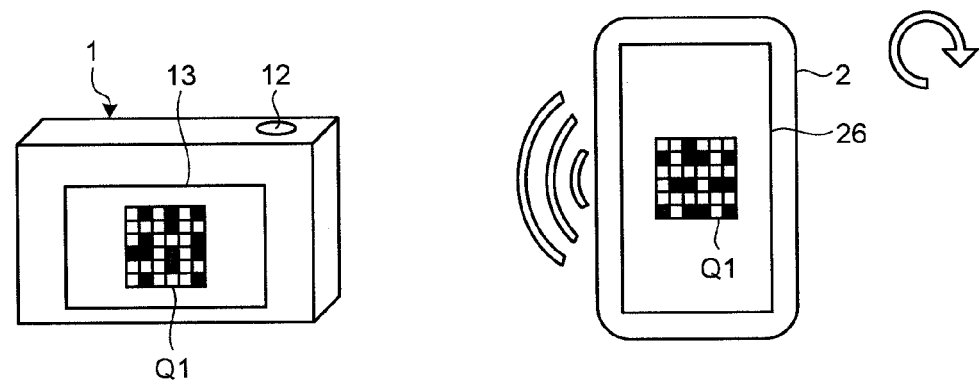
Figure 10D:
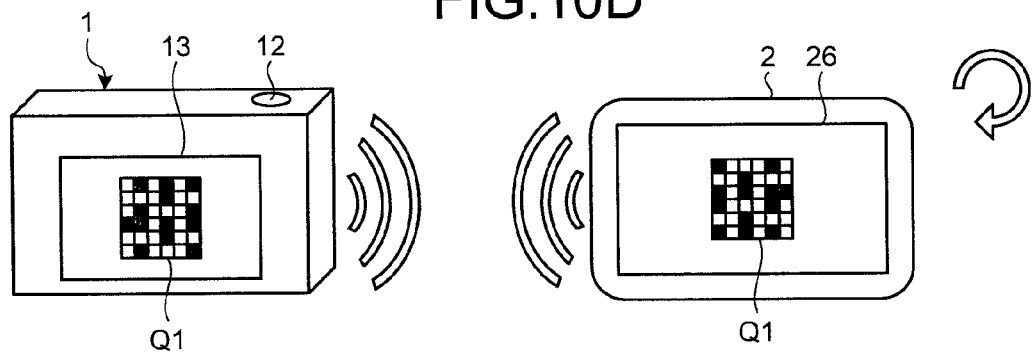

FIGS. 9A and 9B are diagrams for schematically describing a state when the communication apparatus 1 and the portable apparatus 2 establish wireless communication. FIGS. 10A to 10D are diagrams for schematically describing a state when the communication apparatus 1 transmits content data to the portable apparatus 2 after wireless communication is established between the communication apparatus 1 and the portable apparatus 2.

As illustrated in FIGS. 9A and 9B, first, the communication apparatus 1 causes a QR code image Q1 corresponding to setting information for performing wireless communication with the portable apparatus 2 according to a specified wireless communication standard to be displayed on the display unit 13, and causes the operation icons A1 and A2 for receiving an input of a designation signal designating a specific operation to be executed by the portable apparatus 2 in order to transmit content data to be displayed on the display unit 13 (FIG. 9A). At this time, the portable apparatus 2 images the QR code image Q1 displayed on the display unit 13 of the communication apparatus 1. Then, the setting information extracting unit 302 of the portable apparatus 2 extracts setting information W1 including the identification information of the communication apparatus 1 and the password corresponding to the identification information included in the QR code image Q1 imaged by the imaging unit 21, and the display control unit 306 causes the setting information W1 to be displayed on the display unit 26 (FIG. 9B). Thereafter, the portable apparatus 2 transmits a password to the communication apparatus 1. As a result, wireless communication is established between the communication apparatus 1 and the portable apparatus 2. Further, an input of the designation signal designating the specific operation to be executed by the portable apparatus 2 may be received through the input unit 12 of the communication apparatus 1. In addition, the communication apparatus 1 may receive an input of gesture or motion as the specific operation to be executed by the portable apparatus 2.

Thereafter, as illustrated in FIGS. 10A to 10D, in the case in which the communication apparatus 1 transmits the content data to the portable apparatus 2 after wireless communication is established between the communication apparatus 1 and the portable apparatus 2, content transmission is performed according to the specific operation designated by the communication apparatus 1.

In the case in which the specific operation is an operation of rotating the portable apparatus 2, when the user rotates the portable apparatus 2 and so there is a change in images (FIGS. 10A to 10D) obtained by consecutively imaging the QR code image Q1 displayed on the display unit 13 of the communication apparatus 1, the operation information converting unit 183 of the apparatus 1 can determine that this operation is a specified motion. In other words, the portable apparatus 2 transmits image conversion data in which the QR code image Q1 imaged by the imaging unit 21 changes by rotation designated by the communication apparatus 1 to the communication apparatus 1 as the operation information. Thereafter, when the image conversion data received from the portable apparatus 2 matches the image conversion data converted according to the designated specific operation, the transmission control unit 185 of the communication apparatus 1 transmits the content data to the portable apparatus 2. However, when the image conversion data received from the portable apparatus 2 does not match the image conversion data converted according to the designated specific operation, the communication apparatus 1 does not transmit the content data to the portable apparatus 2. In other words, the portable apparatus 2 may need only to transmit an image, and the communication apparatus 1 analyzes the image, but the operation information converting unit 303 of the portable apparatus 2 may perform motion determination from an image change, and in this case, the operation information is preferably transmitted to the apparatus 1. The operation information is based on a relative position change among a plurality of apparatuses performing communication with each other which is obtained between mobile devices other than a switch operation of an apparatus.

As described above, the communication apparatus 1 can transmit the content data when the specific operation designated by the user is performed by the portable apparatus 2. Further, since a password for establishing communication may differ from a password for transmitting content data, even though the password leaks to a third person, the communication apparatus 1 does not transmit content data unless the portable apparatus 2 performs the specific operation designated by the user, and thus the security is high.

Figure 11:
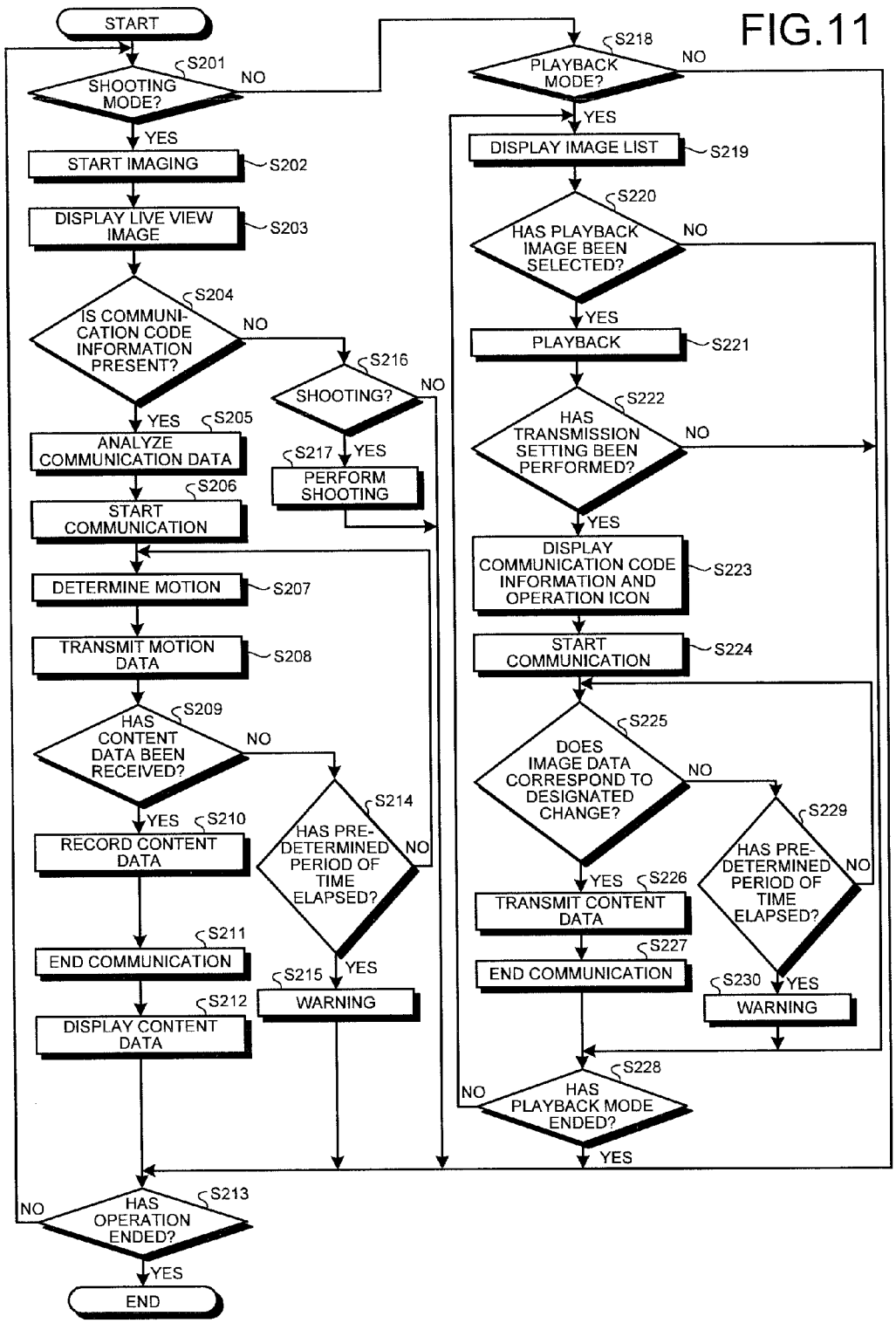
FIG. 11 is a flowchart illustrating an outline of a process executed by the communication apparatus according to the second embodiment of the present invention.

Next, an outline of a process executed by the communication apparatus 1 will be described. FIG. 11 is a flowchart illustrating an outline of a process executed by the communication apparatus 1. The same process as in the flowchart illustrated in FIG. 11 may be performed by the portable apparatus 2.

Steps S201 to S206 correspond to steps S101 to S106 of FIG. 6, respectively.

In step S207, the operation information converting unit 183 determines motion of the QR code image Q1 in the live view image corresponding to the image data consecutively imaged by the imaging unit 11. Specifically, the operation information converting unit 183 determines whether or not the QR code image Q1 in the live view image corresponding to the image data consecutively imaged by the imaging unit 11 changes according to the specific operation designated by the portable apparatus 2, for example, whether or not the position of the QR code image Q1 on the display unit 26 has changed as the communication apparatus 1 rotates while imaging the QR code image Q1 displayed on the display unit 26 of the portable apparatus 2, and converts the determination result into operation information for receiving content data from the portable apparatus 2. The operation information converting unit 183 may determine whether or not the communication apparatus 1 has rotated based on a detection result of the geomagnetic detecting unit 24 as well as the change in the QR code image Q1.

Then, the transmission control unit 185 transmits the image motion change data determined by the operation information converting unit 183 to the portable apparatus 2 through the transceiving unit 16 (step S208).

Steps S209 to S224 correspond to steps S109 to S124 of FIG. 6, respectively.

In step S225, the transmission control unit 185 determines whether or not the image motion change data serving as the setting information received from the portable apparatus 2 matches motion change data corresponding to the designated specific operation. When it is determined that the image motion change data serving as the setting information received from the portable apparatus 2 matches motion change data corresponding to the designated specific operation (Yes in step S225), the transmission control unit 185 transmits the content data recorded by the recording unit 15 to the portable apparatus 2 through the transceiving unit 16 (step S226).

Steps S227 to S230 correspond to steps S127 to S130 of FIG. 6, respectively.

According to the above-described second embodiment of the present invention, when the operation information converted according to the specific operation of the portable apparatus 2 received by the transceiving unit 16 matches the operation information recorded by the setting information recording unit 151, the transmission control unit 185 causes the content data to be transmitted to the portable apparatus 2. Thus, the security is excellent, and it is possible to perform two-way wireless communication with the portable apparatus 2 by an easy operation.

Furthermore, according to the second embodiment of the present invention, when the portable apparatus 2 receives the content data from the communication apparatus 1, the specific operation performed by the portable apparatus 2 can be designated by using a touch of the icon displayed on the display panel together, and thus the security is high.

Third Embodiment

Next, a third embodiment of the present invention will be described. The third embodiment differs from the above-described embodiments in a specific operation and process for transmitting and receiving content data. Thus, in the following, configurations of the communication apparatus and the portable apparatus according to the third embodiment will be first described, and then the process executed by the communication apparatus and the portable apparatus according to the third embodiment will be described. The same components as in the first embodiment described above are denoted by the same reference numerals.

Figure 12:
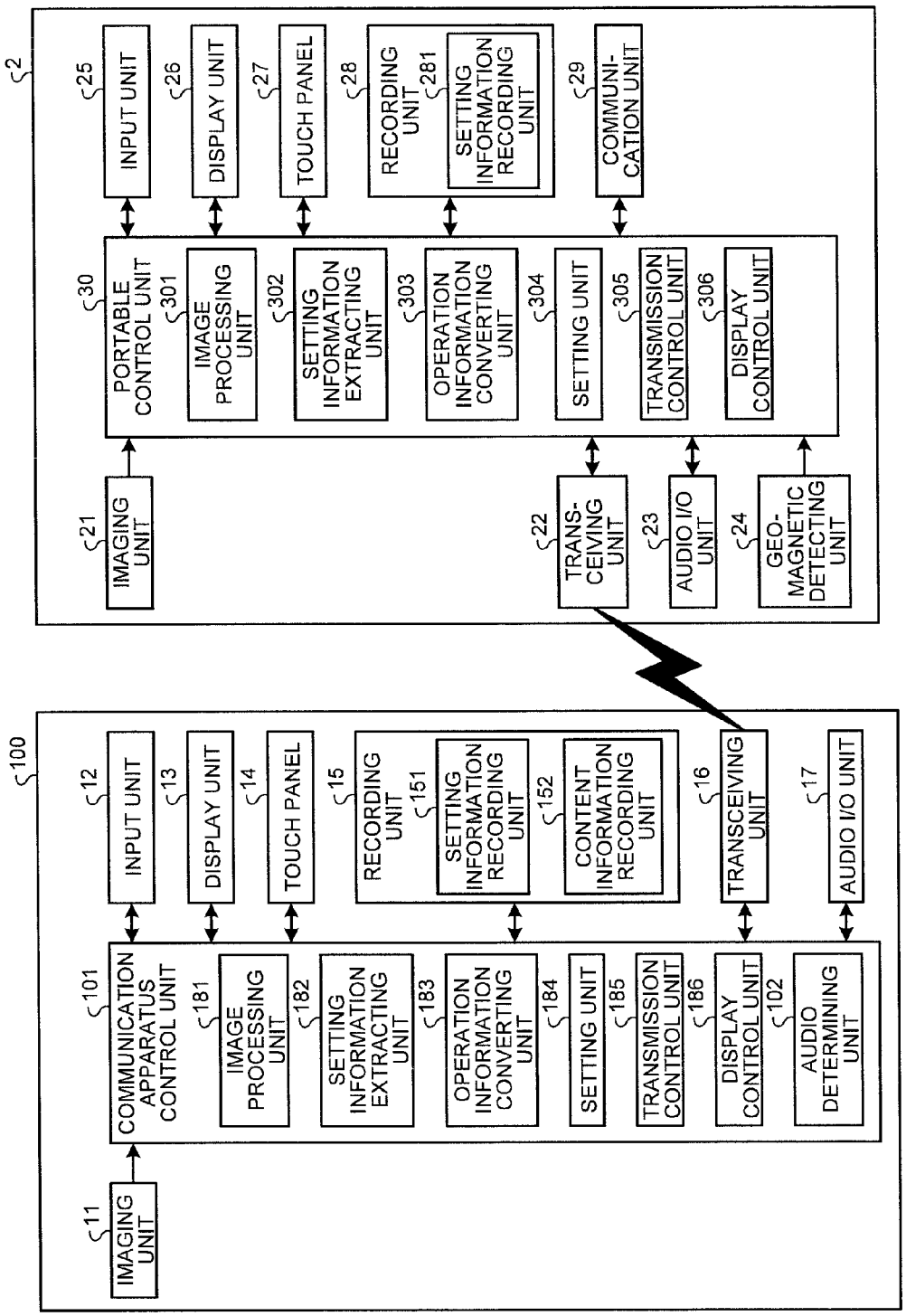
FIG. 12 is a block diagram illustrating configurations of a communication apparatus and a portable apparatus according to a third embodiment of the present invention.

FIG. 12 is a block diagram illustrating a configuration of the communication apparatus and the portable apparatus according to the third embodiment. A communication apparatus 100 illustrated in FIG. 12 includes an imaging unit 11, an input unit 12, a display unit 13, a touch panel 14, a recording unit 15, a transceiving unit 16, an audio I/O unit 17, and a communication apparatus control unit 101.

The communication apparatus control unit 101 includes an image processing unit 181, a setting information extracting unit 182, an operation information converting unit 183, a setting unit 184, a transmission control unit 185, a display control unit 186, and an audio determining unit 102.

The audio determining unit 102 determines audio data input from the audio I/O unit 17. Specifically, when the communication apparatus 100 transmits content data through wireless communication with the portable apparatus 2, the audio determining unit 102 determines whether or not a sound corresponding to the specific operation designated by the communication apparatus 100 has been emitted. For example, when the specific operation designated by the communication apparatus 100 is a shutter sound of the imaging unit 21 of the portable apparatus 2, the audio determining unit 102 determines whether or not audio data input from the audio I/O unit 17 is a shutter sound. Further, when audio data previously recorded in the portable apparatus 2 is played back, the audio determining unit 102 determines that the sound corresponding to the specific operation designated by the communication apparatus 100 has been emitted.

Figure 13:
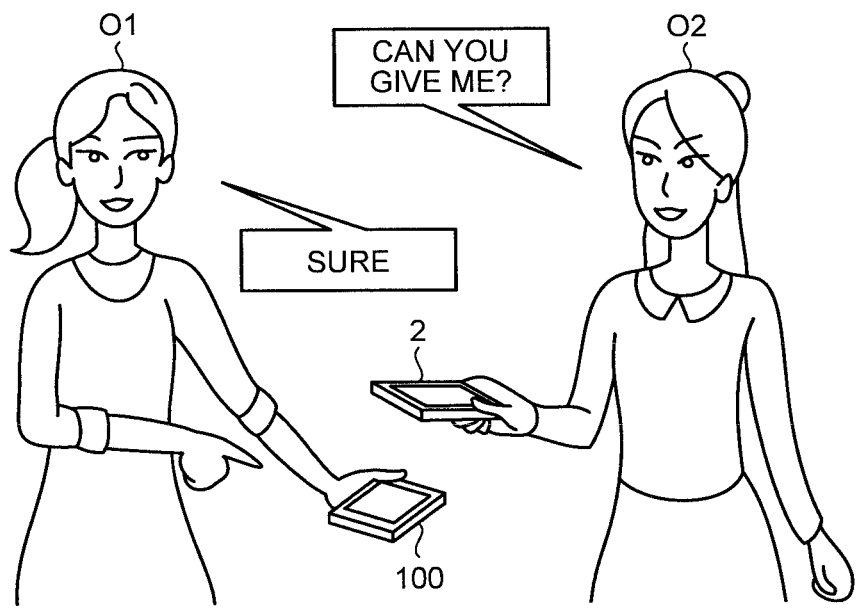
FIG. 13 is a diagram for describing an outline of a communication process executed by the communication apparatus and the portable apparatus according to the third embodiment of the present invention.
Figure 14:
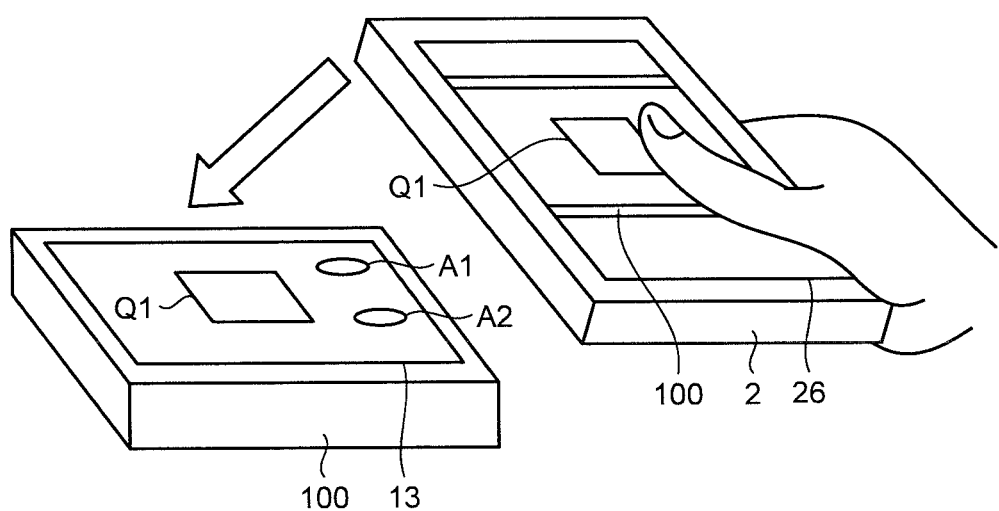
FIG. 14 is a diagram for schematically describing a state of FIG. 13.

FIG. 13 is a diagram for describing an outline of a communication process executed by the communication apparatus 100 and the portable apparatus 2. FIG. 14 is a diagram for schematically describing a state of FIG. 13. In FIGS. 13 and 14, the communication apparatus 100 remains set to the playback mode, and the portable apparatus 2 remains set to the shooting mode.

As illustrated in FIG. 13, in the case in which wireless communication with the portable apparatus 2 is performed according to a specified wireless communication standard to transmit content data, when the portable apparatus 2 performs the specific operation designated by the communication apparatus 100, the communication apparatus 100 establishes wireless communication with the portable apparatus 2. Specifically, as illustrated in FIGS. 13 and 14, the communication apparatus 100 establishes wireless communication with the portable apparatus 2 when the portable apparatus 2 emits the shutter sound. For example, when the user O2 asks the user O1 to give content data to the user O2, and shoots the communication apparatus 100 through the portable apparatus 2, the communication apparatus 100 determines that the shutter sound of the imaging unit 21 of the portable apparatus 2 matches the specific operation, and transmits the content data to the portable apparatus 2.

As described above, the communication apparatus 100 can transmit content data when the portable apparatus 2 emits the shutter sound as the designated specific operation. In addition, since a password for establishing communication may differ from a password for transmitting content data, even though the password leaks to a third person, the communication apparatus 100 does not transmit content data unless the designated specific operation is performed, and thus the security is high.

Figure 15:
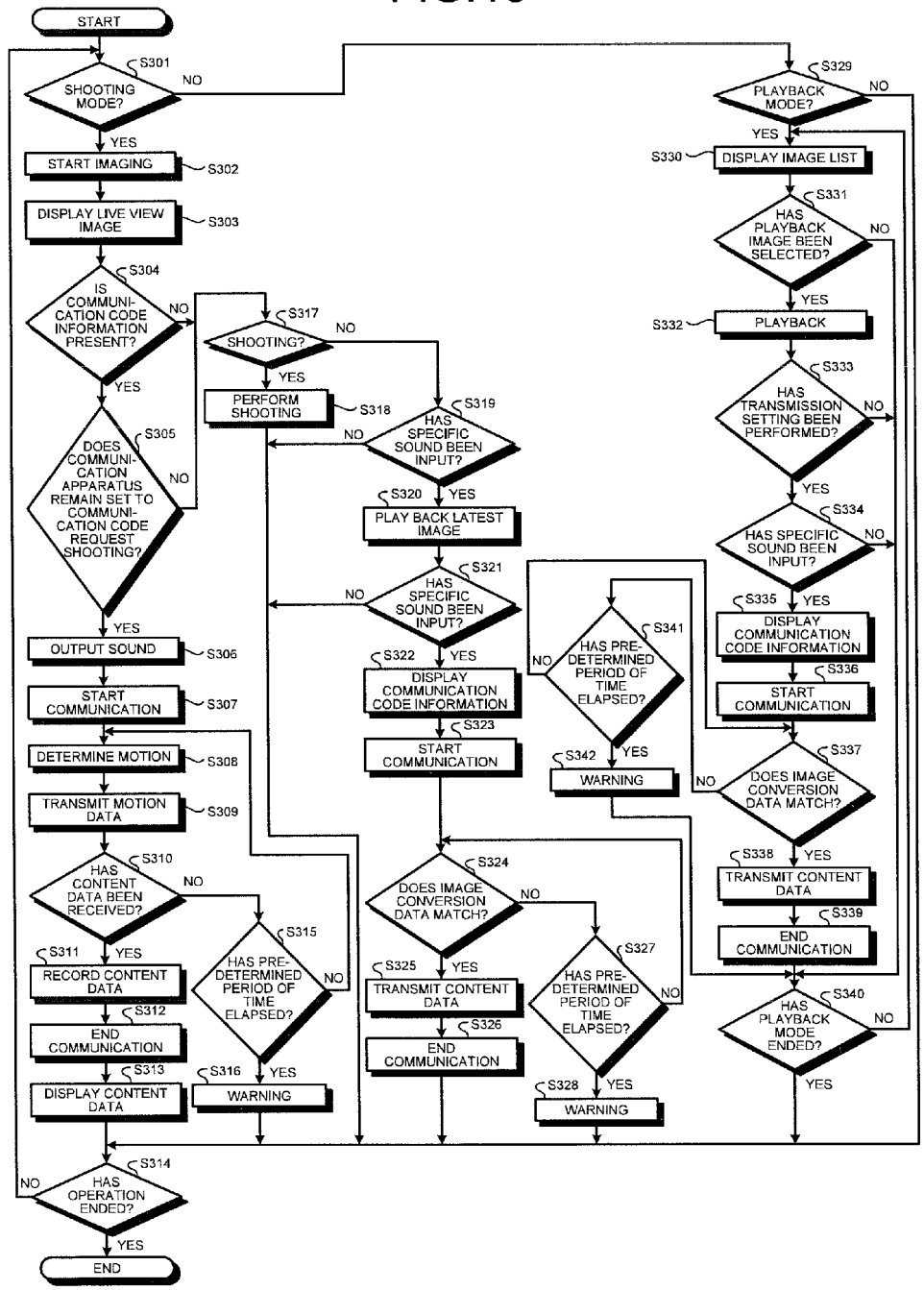
FIG. 15 is a flowchart illustrating an outline of a process executed by the communication apparatus according to the third embodiment of the present invention.

Next, an outline of a process executed by the communication apparatus 100 will be described. FIG. 15 is a flowchart illustrating an outline of a process executed by the communication apparatus 100. The same process as in the flowchart illustrated in FIG. 15 may be performed by the portable apparatus 2.

Steps S301 to S304 correspond to steps S101 to S104 of FIG. 6, respectively.

In step S305, the communication apparatus control unit 101 determines whether or not the communication apparatus 100 remains set to communication code request shooting. When the communication apparatus control unit 101 determines that the communication apparatus 100 remains set to communication code request shooting (Yes in step S305), the communication apparatus 100 causes the process to proceed to step S306 which will be described later. However, when the communication apparatus control unit 101 determines that the communication apparatus 100 does not remain set to communication code request shooting (No in step S305), the communication apparatus 100 causes the process to proceed to step S317 which will be described later.

In step S306, the communication apparatus 100 outputs a sound corresponding to the specific operation designated by the portable apparatus 2. Specifically, the communication apparatus 100 drives a shutter of the imaging unit 11 and outputs the shutter sound.

Then, the transmission control unit 185 starts wireless communication with the portable apparatus 2 according to a wireless communication standard (step S307).

Thereafter, the operation information converting unit 183 determines motion of the QR code image Q1 in the live view image corresponding to the image data consecutively imaged by the imaging unit 11 (step S308).

Then, the transmission control unit 185 transmits the image motion change data determined by the operation information converting unit 183 to the portable apparatus 2 through the transceiving unit 16 (step S309).

Steps S310 to S318 correspond to steps S109 to S117 of FIG. 6, respectively.

In step S319, the audio determining unit 102 determines whether or not a specific sound corresponding to the specific operation has been input. Specifically, when the communication apparatus 100 performs shooting in the shooting mode, the audio determining unit 102 determines whether or not the shutter sound has been input from the portable apparatus 2. When the audio determining unit 102 determines that the specific sound corresponding to the specific operation has been input (Yes in step S319), the communication apparatus 100 causes the process to proceed to step S320 which will be described later. However, when the audio determining unit 102 determines that the specific sound corresponding to the specific operation has not been input (No in step S319), the communication apparatus 100 causes the process to proceed to step S314.

In step S320, the display control unit 186 causes a latest image corresponding to latest image data among a plurality of pieces of image data recorded by the recording unit 15 to be displayed on the display unit 13.

Thereafter, the audio determining unit 102 determines whether or not the specific sound has been input from the portable apparatus 2 (step S321). When the audio determining unit 102 determines that the specific sound has been input from the portable apparatus 2 (Yes in step S321), the communication apparatus 100 causes the process to proceed to step S322. However, when the audio determining unit 102 determines that the specific sound has not been input from the portable apparatus 2 (No in step S321), the communication apparatus 100 causes the process to proceed to step S314.

Steps S322 to S328 correspond to steps S123 to S130 of FIG. 6, respectively, and steps S329 to S333 correspond to steps S118 to S122 of FIG. 6, respectively.

In step S334, the audio determining unit 102 determines whether or not the specific sound has been input from the portable apparatus 2. When the audio determining unit 102 determines that the specific sound has been input from the portable apparatus 2 (Yes in step S334), the communication apparatus 100 causes the process to proceed to step S335. However, when the audio determining unit 102 determines that the specific sound has not been input from the portable apparatus 2 (No in step S334), the communication apparatus 100 causes the process to proceed to step S340.

Steps S335 to S342 correspond to steps S123 to S130 of FIG. 6, respectively.

According to the above-described third embodiment of the present invention, when the audio determining unit 102 determines that the sound corresponding to the specific operation designated by the communication apparatus 100 has been input from the portable apparatus 2, the content data is transmitted to the portable apparatus 2. Thus, the security is excellent, and it is possible to perform two-way wireless communication with the portable apparatus 2 by an easy operation.

Further, according to the third embodiment, when the portable apparatus 2 receives the content data from the communication apparatus 100, since it is possible to designate the specific operation to be performed by the portable apparatus 2, the security is high.

Furthermore, according to the third embodiment, when the communication apparatus 100 remains set to the shooting mode and the portable apparatus 2 emits the sound corresponding to the specific operation, wireless communication is established between the communication apparatus 100 and the portable apparatus 2. As a result, wireless communication can be performed by a simple operation.

Further, in the third embodiment, the shutter sound is used to establish wireless communication, but for example, wireless communication may be established when the communication apparatus 100 receives light which is emitted toward a specified field of view region from the portable apparatus 2. In addition, when the communication apparatus 100 remains set to the shooting mode and the communication apparatus 100 receives light emitted from the portable apparatus 2, latest image data may be transmitted to the portable apparatus 2.

Further, in the third embodiment, the shutter sound is used to establish wireless communication, but a specific sound for establishing wireless communication may be acquired via a network, and then wireless communication may be established using the acquired sound.

Other Embodiments

In the present invention, content data and setting information are bidirectionally transmitted and received through the transceiving unit, but each of the communication apparatus and the portable apparatus may include a communication unit connectable to the Internet, content data and setting information may be bidirectionally transmitted and received via a network. Further, content data and setting information may be bidirectionally transmitted and received via a server on a network.

Further, in the present invention, the approaching operation (which can be determined by a simple operation and easily understood from intuition transferring data), the rotating operation which can enhance the security and can cope with the non-approaching state), the sound-generating operation (which is simple and cause various settings to be made), and the light-emitting operation (which is direction and thus high in the security) are used as the specific operation. However, the present invention is not limited to the above examples, but, for example, a password associated with an operation may be set according to a result of determining an operation designated by a sound by sound analysis, and when it is determined as a corresponding operation, it may be determined that passwords match. In this case, designation is simple, and various operations such rotating while approaching can be designated. Further, other operations may be used, and a contact operation between the communication apparatus and the portable apparatus (a hitting operation) (which is an image in which at the time of contact, communication is established and data is transfer and thus intuitive), a throwing operation (which is an operation in which data flies and thus intuitive), a shaking operation (which is an image in which data is sifted and falls down and thus intuitive), and a circle-drawing operation (which is an operation an image in which data is sifted and falls down and thus intuitive, and is complicated in an operation and high in security), and an operation of moving at a constant speed (a direction may not be an approaching direction, and a degree of freedom is high), or an operation of moving away by a specified distance (which is high in a degree of freedom) may be applied. The operations are collectively represented by a relative position change between a plurality of apparatuses performing communication with each other which is obtained between mobile devices other than a switch operation of an apparatus. The relative position change is obtained according to an imaging result and obtained by a series of actions. Since code information to be imaged can be converted into text information, and an input of an ID and a password is performed during an action, and the process is rapidly performed. The code and the text may be encrypted.

Further, the present invention can be applied to a communication establishing method of establishing communication between different apparatuses. Specifically, in a communication establishing method of establishing communication between a first apparatus and a second apparatus, a communication code displayed on the second apparatus may be captured by the first apparatus, the first apparatus may determine operation information including a relative position change between the first apparatus and the second apparatus associated with the shooting, the first apparatus may transmit the operation information to the second apparatus, and the second apparatus may acquire the transmitted information from the first apparatus.

Further, the present invention can be applied to a communication apparatus that performs wireless communication with another apparatus and receives content data including image data. In this case, a communication apparatus includes a transceiving unit that receives operation information representing a relative position change between another apparatus and a communication apparatus from another apparatus in order to establish wireless communication with another apparatus and a transmission control unit that causes the receiving unit to establish communication for receiving the content data transmitted from another apparatus when the operation information received by the transceiving unit matches operation information which is set in advance. Thus, when the operation information including a range, a distance, and a motion designated by the communication apparatus side is received by the transmission apparatus side, communication may be established. In other words, when the operation information previously set by the communication apparatus is recognized by an apparatus or a mobile device that delivers content data such as advertising by wireless communication, communication is established to transmit content data. As a result, it is possible to receive content data from another apparatus only when the user of the communication apparatus gives permission, for example, for advertising.

Further, in the present invention, the imaging unit has been described in connection with an example of a digital camera installed in one housing, but can be applied to a single-lens reflex digital camera configured with a lens device having a removable lens unit and a main body.

Further, the communication apparatus according to the present invention can be applied to an electronic apparatus such as a digital camera with a removable accessory, a digital video camera, a mobile phone having a shooting function, and a table type portable apparatus as well as a digital camera.

Further, a program executed by a communication apparatus according to the present invention is file data having an installable format or an executable format, and recorded in a computer readable recording medium such as a CD-ROM, a flexible disk (FD), a CD-R, a digital versatile disk (DVD), a USB medium, and a flash memory and provided.

Further, a program executed by a communication apparatus according to the present invention may be configured to be provided such that the program is stored in a computer connected to a network such as the Internet and downloaded via the network. Further, a program executed by the display device according to the present invention may be configured to be provided or distributed via a network such as the Internet.

In the description of the flowchart in this disclosure, a sequence of the process between steps is represented using expressions such as "first," "thereafter," and "next," but the sequence of the process necessary to implement the present invention is not uniquely decided by the expression. In other words, the sequence of the process in the flowchart described in this disclosure can be changed within a range having no contradiction.

As described above, the present invention includes various embodiments which are not described in this disclosure, and various design changes can be made within a range of a technical spirit set forth in claims.

Additional Note 1

A communication apparatus, including:

a transmitting unit that transmits image change information according to a temporal change of a display image indicating an apparatus ID read from an image obtained by imaging; and a transmission control unit that causes the transmitting unit to transmit content data to a counterpart apparatus with which communication has been established based on the image change information.

Additional Note 2

A communication apparatus, including:

a transceiving unit that transmits and receives content data; and a transmission control unit that receives information on a change in a captured image from outside, determines that passwords for establishing wireless communication with the counterpart apparatus match each other when the captured image substantially matches a designated change, and causes the transceiving unit to transmit the content data to the counterpart apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus that performs wireless communication with another portable apparatus and transmits content data including image data, the communication apparatus comprising:

an operation information converting unit that converts a relative position change between the other portable apparatus and the communication apparatus, other than a switch operation, into operation information corresponding to the relative position change in order to establish wireless communication with the other portable apparatus;

a transceiving unit that receives the operation information from the other portable apparatus; and a transmission control unit that causes the transceiving unit to establish communication for transmitting the content data to the other portable apparatus responsive to a determination that the operation information received by the transceiving unit and corresponding to the relative position change matches operation information which was designated in advance by a setting unit in accordance with a user input.

2. The communication apparatus according to claim 1, further comprising a display unit that displays setting information for establishing communication, wherein the operation information is information converted according to a temporal change of a result of imaging the setting information displayed on the display unit.

3. The communication apparatus according to claim 1, further comprising a display unit that displays setting information for establishing communication, wherein the operation information is information converted according to the setting information that changes according to consecutive imaging by the other portable apparatus.

4. The communication apparatus according to claim 1, further comprising a display unit that displays setting information for establishing communication, wherein the operation information is information converted according to size of the setting information that changes according to consecutive imaging by the other portable apparatus.

5. The communication apparatus according to claim 2, further comprising:

an audio detecting unit that detects a sound;

an audio determining unit that determines whether or not the sound detected by the audio detecting unit is a sound output from the other portable apparatus; and a display control unit that causes the display unit to display the setting information when the audio determining unit determines that the sound detected by the audio detecting unit is the sound output from the other portable apparatus.

6. The communication apparatus according to claim 2, further comprising a setting unit that sets the setting information including identification information of the communication apparatus for establishing wireless communication with the other portable apparatus, a password corresponding to the identification information, and operation information to permit transmission of the content data according to a specific operation of the other portable apparatus.

7. A method for performing wireless communication between a first apparatus and a second, portable, apparatus and for transmitting content data including image data, the method comprising:

converting a relative position change between the second, portable, apparatus and the first apparatus, other than a switch operation, into operation information corresponding to the relative position change to establish wireless communication with the second, portable, apparatus;

receiving, with a transceiving unit, the operation information from the second, portable, apparatus; and causing the transceiving unit to establish communication for transmitting the content data to the second, portable, apparatus responsive to a determination that the operation information received by the transceiving unit and corresponding to the relative position change matches operation information which was designated in advance by a setting unit in accordance with a user input.

8. A non-transitory computer storage medium having stored thereon instructions, which when executed by at least one processor, cause the at least one processor to perform a method for performing wireless communication between a first apparatus and a second, portable, apparatus and for transmitting content data including image data, the method comprising:

converting a relative position change between the second, portable, apparatus and the first apparatus, other than a switch operation, into operation information corresponding to the relative position change to establish wireless communication with the second, portable, apparatus;

receiving, with a transceiving unit, the operation information from the second, portable, apparatus; and causing the transceiving unit to establish communication for transmitting the content data to the second, portable, apparatus responsive to a determination that the operation information received by the transceiving unit and corresponding to the relative position change matches operation information which was designated in advance by a setting unit in accordance with a user input.

9. The communication apparatus according to claim 1, wherein the relative position change, used by the operation information converting unit to convert the relative position change between the other portable apparatus and the communication apparatus into operation information, is determined by a change in an image displayed by a first of the communication and portable apparatuses, and picked up by a second of the communication and portable apparatuses.

10. The communication apparatus according to claim 9, wherein the change in an image displayed by a first of the communication and portable apparatuses, and picked up by a second of the communication and portable apparatuses, is at least one of (A) a change in a size of the image, and/or (B) a rotation of the image.

11. The communication apparatus according to claim 1, wherein the operation information which was designated in advance by a setting unit in accordance with at least one of (A) a relative size, (B) a relative position, and/or (C) a relative orientation change of the other portable apparatus relative to the communication apparatus, wherein the at least one of (A) a relative size, (B) a relative position, and/or (C) a relative orientation change of the other portable apparatus relative to the communication apparatus is performed by a user of the other portable apparatus.

12. The method according to claim 7, wherein the relative position change, used in the act of converting the relative position change between the second apparatus and the first apparatus into operation information, is determined by a change in an image displayed by one of the first and second apparatuses, and picked up by the other of the first and second apparatuses.

13. The method according to claim 12, wherein the change in an image displayed by one of the first and second apparatuses, and picked up by the other of the first and second apparatuses, is at least one of (A) a change in a size of the image, and/or (B) a rotation of the image.

14. The method according to claim 7, wherein the operation information which was designated in advance by a setting unit in accordance with at least one of (A) a relative size, (B) a relative position, and/or (C) a relative orientation change of the second apparatus relative to the first apparatus, wherein the at least one of (A) a relative size, (B) a relative position, and/or (C) a relative orientation change of the second apparatus relative to the first apparatus is performed by a user of the second apparatus.

* * * * *